UNITED STATES PATENT OFFICE.

KNUD ERSLEV, OF NIJMEGEN, NETHERLANDS.

MANUFACTURE OF MARGARIN.

1,216,674.     Specification of Letters Patent.     Patented Feb. 20, 1917.

No Drawing.     Application filed November 13, 1916. Serial No. 130,999.

*To all whom it may concern:*

Be it known that I, KNUD ERSLEV, a subject of the King of Denmark, residing at Nijmegen, in the Kingdom of the Netherlands, have invented new and useful Improvements in the Manufacture of Margarin, of which the following is a specification.

In manufacturing margarin in the usual way, buttery aroma is imparted thereto by mixing and working into an emulsion therewith, milk, cream, or the like, in which an aromatic flavor has been developed by fermentation, a further quantity of such aromatized milk, cream, or the like, being, if necessary, added to the finished margarin. The aromatized flavoring substances which are developed by such additions are volatile, and liable to readily alter, when the margarin is kept for some time, and care has to be taken that in the finished margarin an after fermentation will take place to form further aromatic substances, but, although in this way the objections are met to a certain extent, they are not completely overcome, and it has been one of the most important problems to satisfactorily retain the buttery aroma imparted to the margarin.

According to my United States Patent No. 1,147,626 this problem is satisfactorily solved by the addition of a lactate of an alkali to the fat.

I have now found that the buttery aroma can also be very efficiently and economically preserved by adding an earth alkali salt of a saturated unoxidized aliphatic acid. The earth alkali salts employed should be innocuous as food and therefore the salts of barium and of strontium are excluded from my claims. Under the term "alkaline earth salts" I, however, include the saturated unoxidized aliphatic salts of magnesium, in my claims. Especially suitable I have found to be alkaline earth salts of acetic, formic and propionic acids, or mixtures of two, or more, of these salts. I have obtained good results with the magnesium and calcium salts of the aforesaid acids as far as such salts are sufficiently soluble in water. Mixtures of any of the aforesaid earth alkali salts are included under my claims. If such an earth alkali salt, say a calcium salt, for instance, is somewhat soluble, but not sufficiently so, it may be used in mixture with another such alkali earth salt which is more soluble, say a magnesium salt, because, to be useful for the purpose of my invention, the alkali earth salt, or mixture of such salts, employed should be sufficiently soluble in water to produce the intended effect.

In carrying out the invention as aforesaid an alkali earth salt, or mixture of such salts is added to the fat which has been emulsified with the fermented aromatized milk, cream, or the like, the mass after cooling being freed from an excess of water by rolling, kneading, or other suitable means. The aforesaid salt, or mixture of salts, can be added in the condition of a fine powder, or as a concentrated solution together with the ingredients (such as egg yolk, cream, or the like), which may be added to the emulsion in the mixer.

The said salt, or mixture of salts, may be added to the fat in different quantities, according to the effect required. As a rule an amount as little as one tenth of one per cent. relatively to the fat, is sufficient. If desired common salt can be added as usual in addition to the aforesaid salt, or mixture of salts.

The following are examples of how my invention may be performed but I do not limit myself to these examples.

*Example 1.*

100 kilograms of a suitable fat are emulsified with the required quantity of fermented aromatized milk and other usual, or suitable, ingredients as desired. After emulsifying and cooling, the mass is kneaded with a suitable quantity of common salt and one fifth of a kilogram of magnesium formate till a homogeneous mass is obtained which may be rolled, or kneaded, in any suitable way.

*Example 2.*

100 kilograms of a suitable fat are emulsified in a mixer with the required quantity of fermented aromatized milk and other usual, or suitable, ingredients as desired, while, during the emulsifying, one fifth of a kilogram of a finely powdered mixture (consisting of one part by weight of calcium acetate and four parts by weight of magnesium acetate) is added. After emulsifying and cooling the mass is rolled, or kneaded, which may be done in any suitable way.

What I claim is:—

1. In the manufacture of margarin, the addition of an earth alkali salt of a saturated, unoxidized, aliphatic acid, for the purpose of preserving the buttery aroma of the margarin.

2. In the manufacture of margarin, the addition of an earth alkali salt of a saturated, unoxidized, aliphatic acid, in amount not less than one tenth of one per cent. relatively to the fat, for the purpose of preserving the buttery aroma of the margarin.

3. In the manufacture of margarin, the addition of an earth alkali acetate, for the purpose of preserving the buttery aroma of the margarin.

4. In the manufacture of margarin, the addition of an earth alkali acetate, in amount not less than one tenth of one per cent. relatively to the fat, for the purpose of preserving the buttery aroma of the margarin.

In testimony whereof I have signed my name to this specification.

KNUD ERSLEV. [L. S.]